(12) United States Patent
Ortiz

(10) Patent No.: US 9,162,918 B2
(45) Date of Patent: Oct. 20, 2015

(54) METHOD AND APPARATUS FOR CLAMPING A SPINNING PREFORM AND REDUCING THE VIBRATION OF TWISTED OPTICAL FIBER FROM A SPINNING PREFORM

(71) Applicant: OFS Fitel, LLC, Norcross, GA (US)

(72) Inventor: Roy M. Ortiz, Ogdensburg, NJ (US)

(73) Assignee: OFS FITEL, LLC, Norcross, GA (US)

( * ) Notice: Subject to any disclaimer, the term of this patent is extended or adjusted under 35 U.S.C. 154(b) by 208 days.

(21) Appl. No.: 13/765,871

(22) Filed: Feb. 13, 2013

(65) Prior Publication Data
US 2014/0225289 A1 Aug. 14, 2014

(51) Int. Cl.
*C03B 37/02* (2006.01)
*B29D 11/00* (2006.01)
*C03B 37/027* (2006.01)

(52) U.S. Cl.
CPC .......... *C03B 37/02* (2013.01); *B29D 11/00721* (2013.01); *C03B 37/02736* (2013.01)

(58) Field of Classification Search
None
See application file for complete search history.

(56) References Cited

U.S. PATENT DOCUMENTS

| | | | | |
|---|---|---|---|---|
| 2,890,888 A * | 6/1959 | Damijonaitis | | 279/106 |
| 3,643,969 A * | 2/1972 | Finley et al. | | 279/4.08 |
| 4,343,638 A * | 8/1982 | Mitachi et al. | | 65/388 |
| 5,581,647 A * | 12/1996 | Onishi et al. | | 385/123 |
| 2006/0115337 A1* | 6/2006 | Higashi | | 408/181 |
| 2009/0038345 A1* | 2/2009 | Otosaka et al. | | 65/424 |

FOREIGN PATENT DOCUMENTS

JP 05279069 A * 10/1993

* cited by examiner

*Primary Examiner* — Lisa Herring
(74) *Attorney, Agent, or Firm* — Mandelbaum Salsburg

(57) ABSTRACT

An apparatus for manufacturing an optical fiber is provided. The apparatus includes a spindle having a bore for receiving a preform of the optical fiber along a longitudinal axis defined by the spindle. A plurality of work holding devices are positioned apart from each other along the longitudinal axis of the spindle and configured to secure the preform against the spindle at two or more distinct positions when the preform is spinning. The plurality of work holding devices comprises any combination of chucks, collets, cams, set screws, or shims. A position of at least one of the work holding device is adjustable to shift the preform away from the longitudinal axis.

14 Claims, 7 Drawing Sheets

METHOD AND APPARATUS FOR CLAMPING A SPINNING PREFORM AND REDUCING THE VIBRATION OF TWISTED OPTICAL FIBER FROM A SPINNING PREFORM

BACKGROUND OF THE INVENTION

1. Field of the Invention

The invention relates generally to optical fibers. More specifically, the invention relates to an apparatus and method for securing an optical fiber preform in a spindle to reduce vibration in a resulting twisted fiber.

2. Discussion of the Related Art

In the fabrication of optical fiber preforms, it is difficult to keep a preform perfectly straight and uniform. In conventional spinning of preforms during fiber draw, resulting non-uniformities permit a preform to wobble when spun. These induced wobbles, known as run-out, may cause a fiber drawn from the preform to oscillate to a point of breaking at high spin rates.

It is desirable to produce fiber that is drawn at high draw speeds. Further, fiber may be twisted as it is being drawn from the preform. Unfortunately, related art techniques that employ gulp and wobble wheels to impart a twist on drawn fiber are limited in the twist rate possible. Other mechanical wheels can increase twist rate but leave a mechanical twist in the fiber that renders the fiber difficult to handle and can damage the fiber's external coating.

Preform spinning overcomes these limitations while providing high twist rates with little mechanical twist left in the optical fiber without imparting damage to the coating. As preforms become larger and more complex (e.g., the production of multi-core fibers), holding and accurately spinning a preform while maintaining tight diameter control and twist rates becomes a problem.

In conventional methods of manufacturing twisted optical fiber from a spinning preform, it is important to have the center of rotation of the preform in line with the optical fiber line. Any run-out of the preform may induce a vibration in the twisted optical fiber when drawn. Further, a non-tightly-secured preform may also induce vibrations in the twisted optical fiber. Variations in preform dimensions may also contribute to excessive run-out.

Thus, a need remains in the art for a method of manufacturing an optical fiber that permits spinning of less than perfect optical fiber preforms of various diameters and that securely holds a preform while reducing induced vibration in both the resulting drawn fiber and in control equipment.

BRIEF SUMMARY OF THE INVENTION

The above-described problems are addressed and a technical solution is achieved in the art by providing an apparatus for manufacturing an optical fiber. The apparatus includes a spindle having a bore for receiving a preform of the optical fiber along a longitudinal axis defined by the spindle. A plurality of work holding devices are positioned apart from each other along the longitudinal axis of the spindle and configured to secure the preform against the spindle at two or more distinct positions when the preform is spinning. The plurality of work holding devices comprises any combination of chucks, collets, cams, set screws, shims, or the like. A position of at least one of the work holding device is adjustable to shift the preform away from the longitudinal axis.

In one embodiment, one of the plurality of work holding devices comprises a collet. The preform may be secured to the spindle at a lower end of the collet with a spindle nose. The preform may be secured to the spindle at an upper end of the collet with a collet closing nut.

In one embodiment, a compression device may be positioned about the preform, for example, between an upper end of the spindle and the collet closing nut, for preventing the collet from unscrewing or extending from the spindle. In one embodiment, the compression device may be a pair of cupped spring washers. The cupped spring washers are configured to be held under compression between the upper end of the spindle and the collet closing nut and are configured to prevent a releasing of the preform during a draw of optical fiber from the preform and during a spinning of the preform.

In one embodiment, another of the plurality of work holding devices comprises a plurality of eccentric cams rotatably affixed to and extending longitudinally from the collet closing nut. The plurality of eccentric cams may be configured for securing the preform to the collet closing nut and to center the preform substantially along the longitudinal axis.

In another embodiment, the apparatus may further comprise a handle affixed to the preform. The handle is operable to light guide radiative heat away from the apparatus. The handle may be made of the same material as the preform. The handle may be fused to the preform along a longitudinal axis of the preform.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

Embodiments of the present invention provide an apparatus for manufacturing an optical fiber. The apparatus includes a spindle having a bore for receiving an optical fiber preform along a longitudinal axis defined by the spindle. A plurality of work holding devices are positioned apart from each other along the longitudinal axis of the spindle and are configured to secure the preform against the spindle at two or more distinct positions when the preform is spinning. The plurality of work holding devices comprises any combination of chucks, collets, cams, set screws, shims, or the like. A position of at least one of the work holding device is adjustable to shift the preform away from the longitudinal axis.

Because a typical preform may not be (1) perfectly cylindrical, (2) perfectly uniform in diameter, and/or (3) may have a bowed shape, gripping or otherwise securing a spinning preform at a single location with a single work holding device may suffer from loosening or shifting of the grip over time, especially when the preform is heated. These deficiencies are overcome by gripping or otherwise securing a spinning preform at two or more distinct positions with a plurality of work holding devices.

A spinning preform may be further secured by positioning a compression device about the preform between two or more work holding devices to prevent the work holding devices from moving from their intended position due to changes in the materials such as from thermal expansion of materials.

The spinning preform may further be provided with a handle affixed to the preform. The handle is operable to light guide radiative heat away from the apparatus and is made of the same material as the preform (e.g., silica, plastic, etc). Without the handle, heat from a furnace radiating into the preform may cause the work holding devices to heat and lose grip of the preform.

Figure 1:
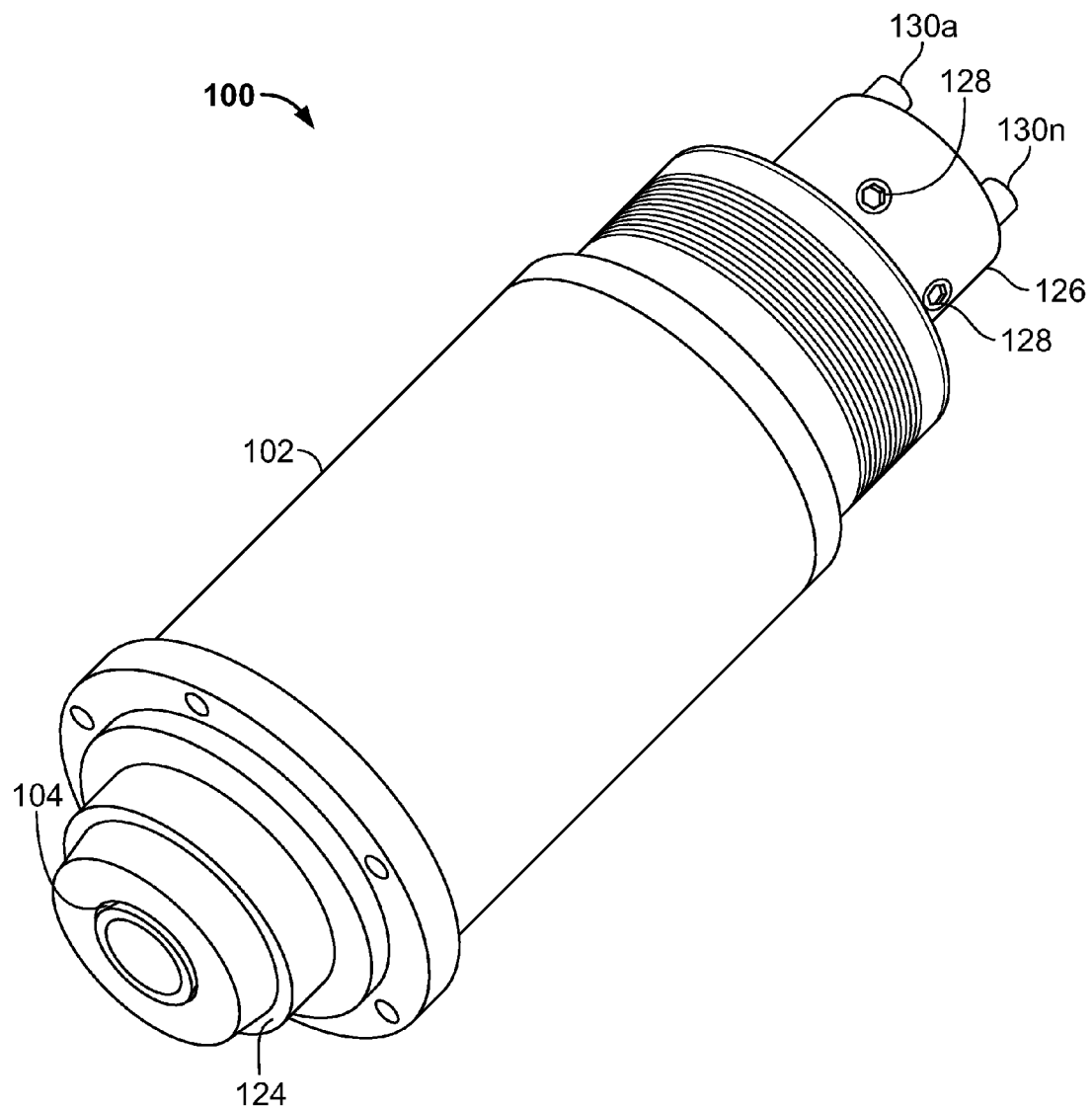
FIG. 1 is a bottom perspective view of an apparatus for manufacturing an optical fiber using a spindle with a collet, according to an embodiment of the present application.
Figure 2:
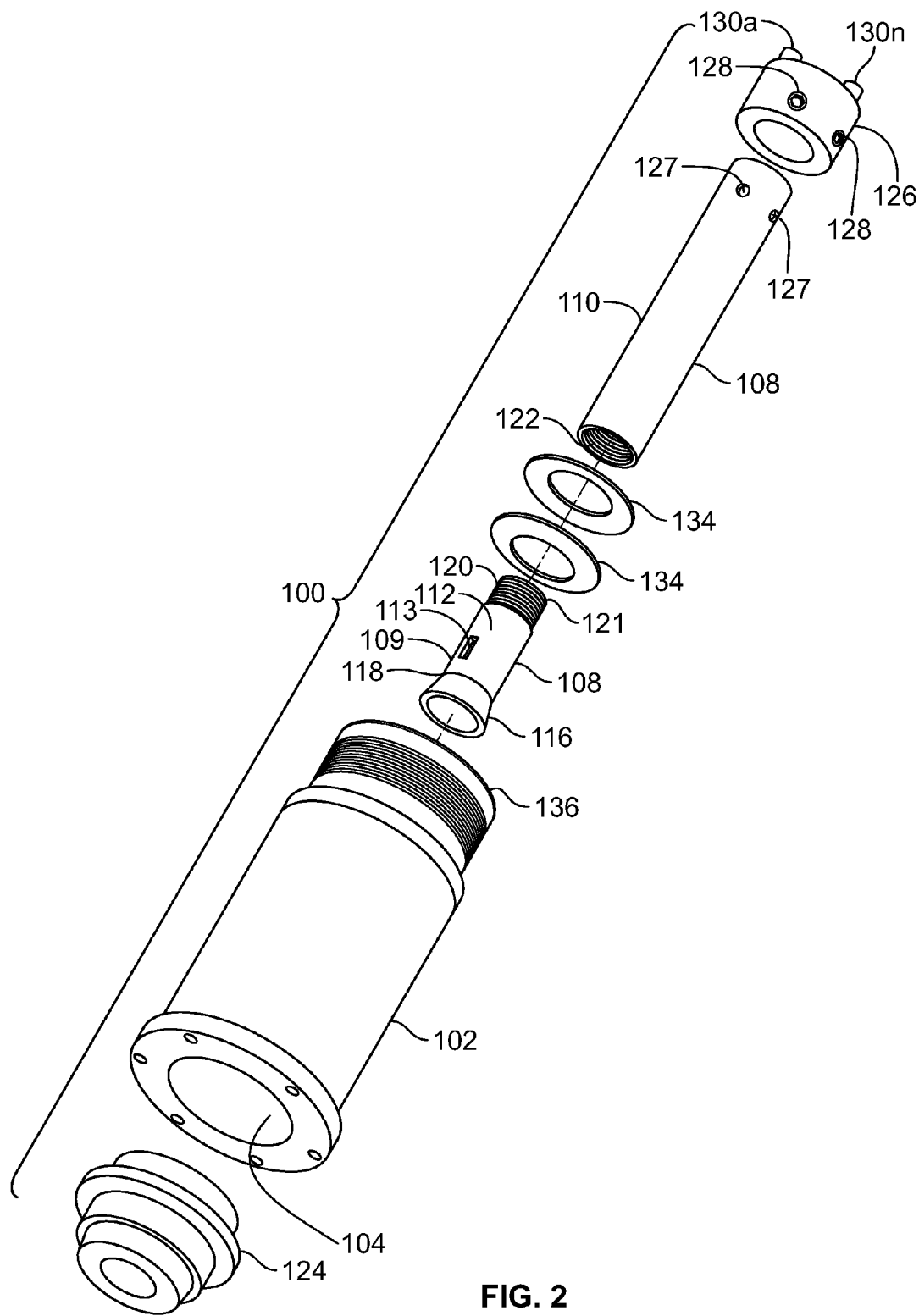
FIG. 2 is an exploded perspective view of the apparatus of FIG. 1.
Figure 3:
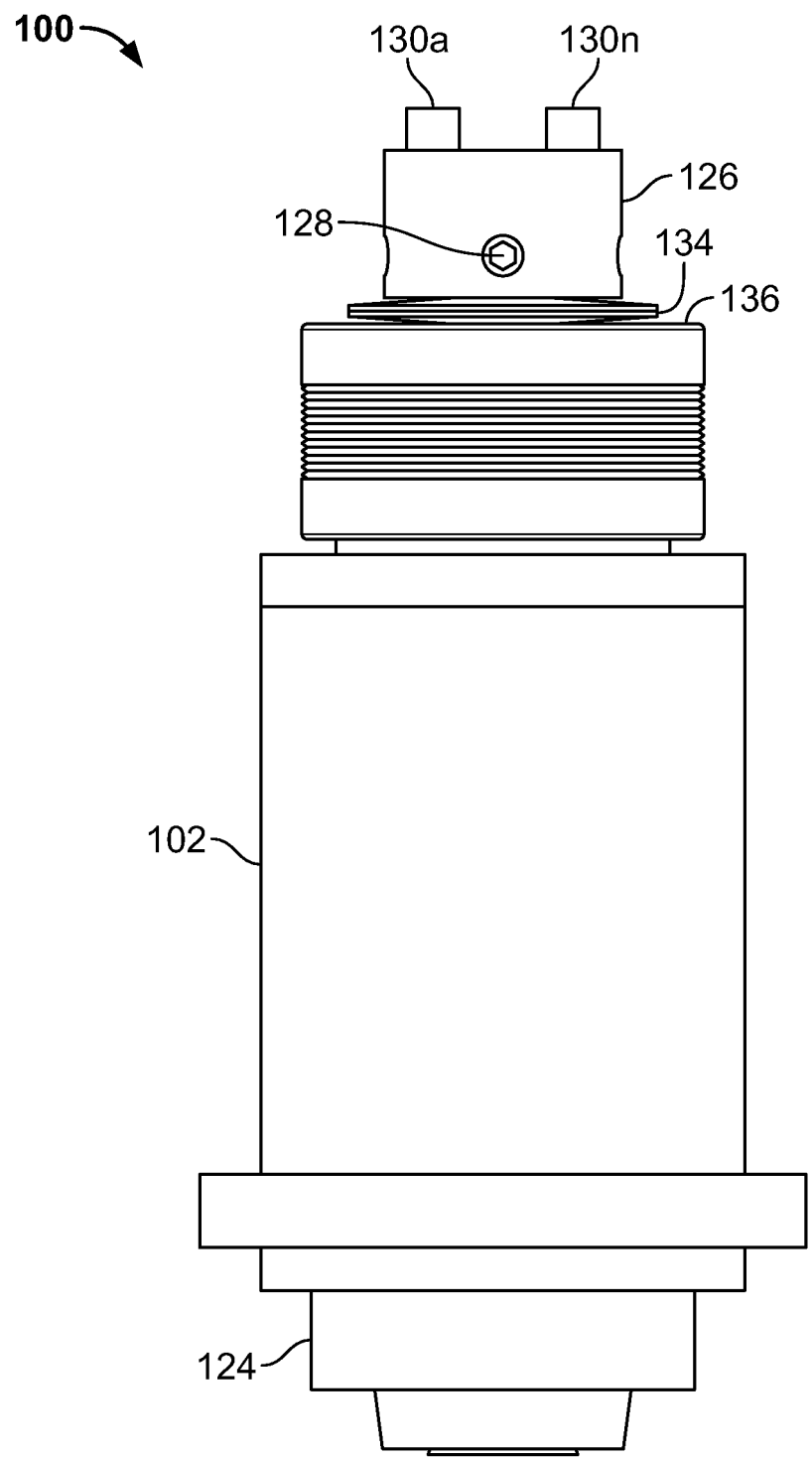
FIG. 3 is a side view of the apparatus of FIG. 1.
Figure 4:
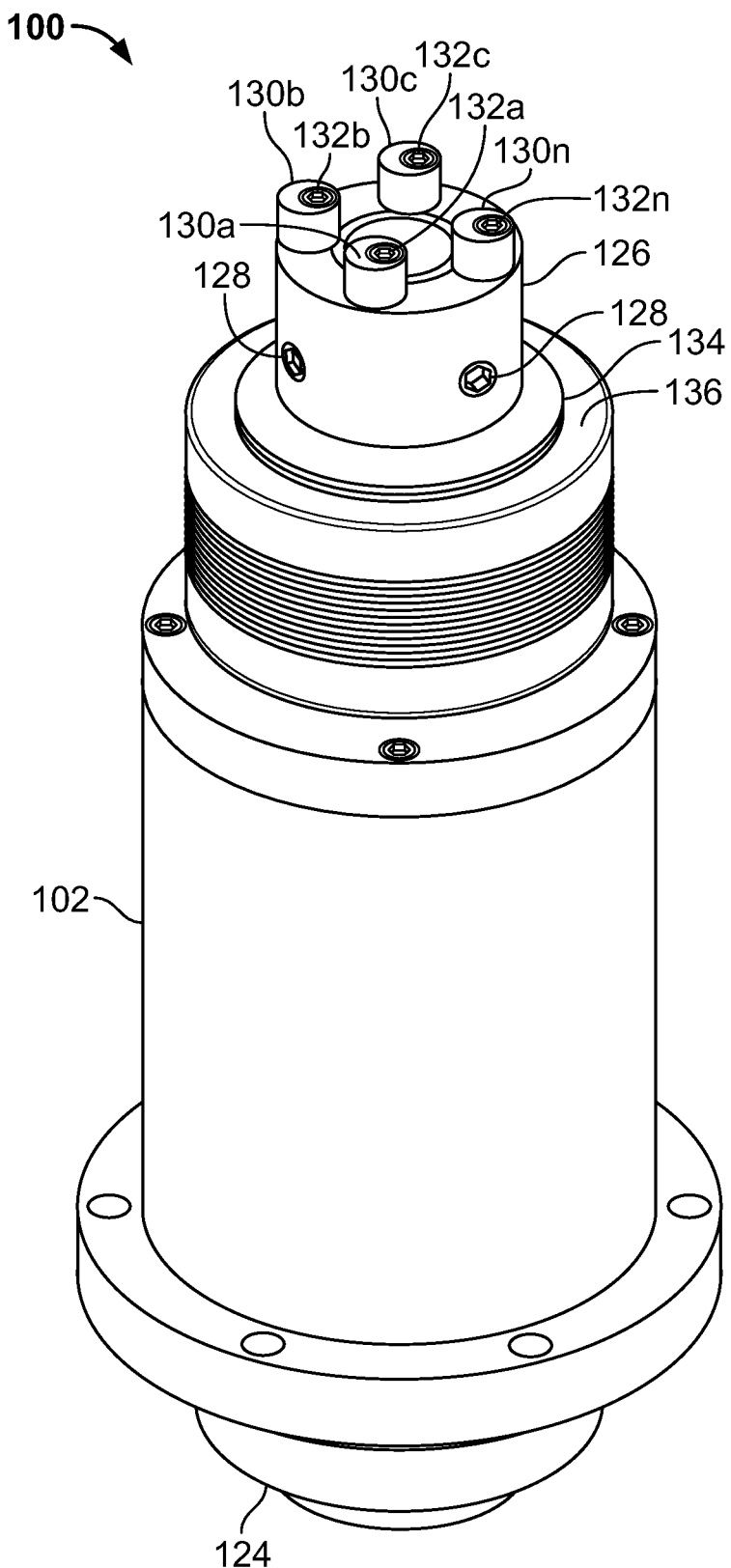
FIG. 4 is a top perspective view of the apparatus of FIG. 1.
Figure 5:
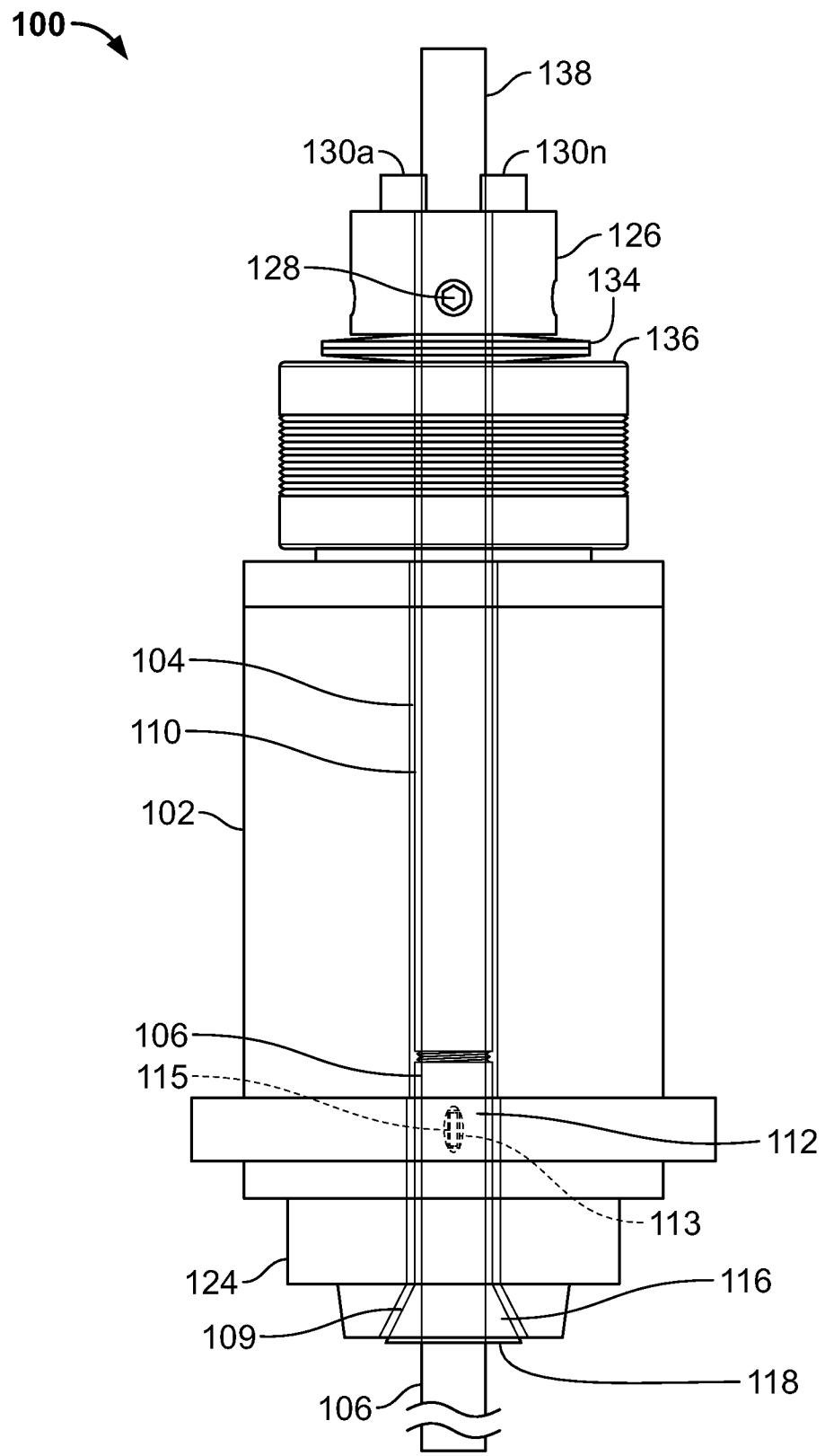
FIG. 5 is a transparent side view of a fiber optic preform inserted within the apparatus of FIG. 1, according to an embodiment of the present invention.

FIGS. 1-5 are various views of one embodiment of an apparatus 100 for manufacturing an optical fiber using a spindle with a collet, according to an embodiment of the present application. The apparatus 100 includes a spindle 102 having a cylindrical bore 104 configured for receiving an optical fiber preform 106, as shown in FIG. 5. The bore 104 of the spindle 102 is sized and shaped to receive a collet 108 (FIG. 2). The collet 108 constitutes one embodiment of the work holding devices described above. The collet 108 comprises a lower collet 109 and an upper collet 110, as shown in FIGS. 2 and 5. The lower collet 109 includes a cylindrical central section 112 with an inner diameter that is slightly larger than the diameter of the preform 106. The lower collet 109 further includes a keyway 113 that mates with a rectangular key 115 in the bore 104 of the spindle 102. The keyway 113 prevents the collet 108 from spinning in the spindle 102 or twisting when a collet closing nut 126 (see below) is tightened.

A flange 116 having a truncated cone shape extends from one end 118 of the central section 112 of the lower collet 109 (FIG. 2). An upper threaded section 120 (FIG. 2) extends from a second end 121 of the central section 112 distal to the flange 116. The upper collet 110 is substantially cylindrical and has an inner threaded surface 122 that is securable to the corresponding upper threaded section 120 of the lower collet 109.

The preform 106 is secured to the lower collet 109 with a spindle nose 124, which can be seen in FIGS. 3-5. The preform 106 is secured to the upper collet 110 with a collet closing nut 126 using, for example, a plurality of circular or hex screws 128. Each of the screws 128 is configured to be secured to an associated mating hole 127 in the upper collet 110. If the diameter of the preform 106 differs substantially from that of the inner diameter 114 (not shown) of the central section 112 of the lower collet 109, then the lower collet 109 may be replaced with another lower collet of inner diameter similar to the diameter of preform 106. Further, the collet 108 may be shaped to have no sharp edges or burrs on an inner surface (i.e., the inner surfaces of the lower collet 109 and the upper collet 110) to prevent scoring of and damaging a surface of the preform 106 (which ultimately damages any resulting optical fibers pulled from the preform 106).

A plurality of eccentric cams 130a-130n best shown in FIG. 4, may be rotatably affixed to and extending longitudinally from the collet closing nut 126. The eccentric cams 130a-130n constitute one embodiment of another of the work holding devices described above. Further, the eccentric cams 130a-130n provide an adjustable mechanism for accommodating shifting the preform 106 away from the longitudinal axis of the spindle 102. The eccentric cams 130a-130n are rotatable about off-center axes 132a-132n configured to secure or clamp the preform 106 to the collet closing nut 126 and to center the preform 106 in the collet 108 and hence the spindle 102. The eccentric cams 130a-130n are further configured to hold the preform 106 in place in the spindle 102 once run-out is reduced.

A pair of cupped spring washers 134, as shown in FIG. 2, may be inserted about the upper collet 110 between an upper end 136 of the spindle 102 and the collet closing nut 126 for further securing and centering the preform 106 in the spindle 102. The cupped spring washers 134 are configured to be held under compression between the upper end 136 of the spindle 102 and the collet closing nut 126 and are used to prevent a releasing of the preform 106 during a drawing of optical fiber from the preform 106 and during a spinning of the preform 106. Thus, the pair of cupped spring washers 134 constitutes one embodiment of a compression device positioned about the preform 106 between two or more work holding devices to prevent the work holding devices from moving from their intended position thermal expansion of materials.

FIG. 5 is a transparent side view of the preform 106 inserted within the apparatus 100, according to an embodiment of the present invention. Referring now to FIG. 5, the apparatus 100 may further be provided with a detached handle 138 configured to be affixed to the preform 106. In one embodiment, the handle 138 may be made of glass or other form of silica and fused to the preform 106. The handle 138 may be substantially cylindrical, of about the same diameter as the preform 106, and configured to extend beyond upper end 136 of the spindle 102 along a longitudinal axis of the preform 106. The handle 138 operates as an infrared transmitting light pipe to reduce heat received by spindle bearings by light guiding away a portion of the received heat. The handle 138 further functions to provide additional torque in a method for reducing run-out to be described below.

Figure 6:
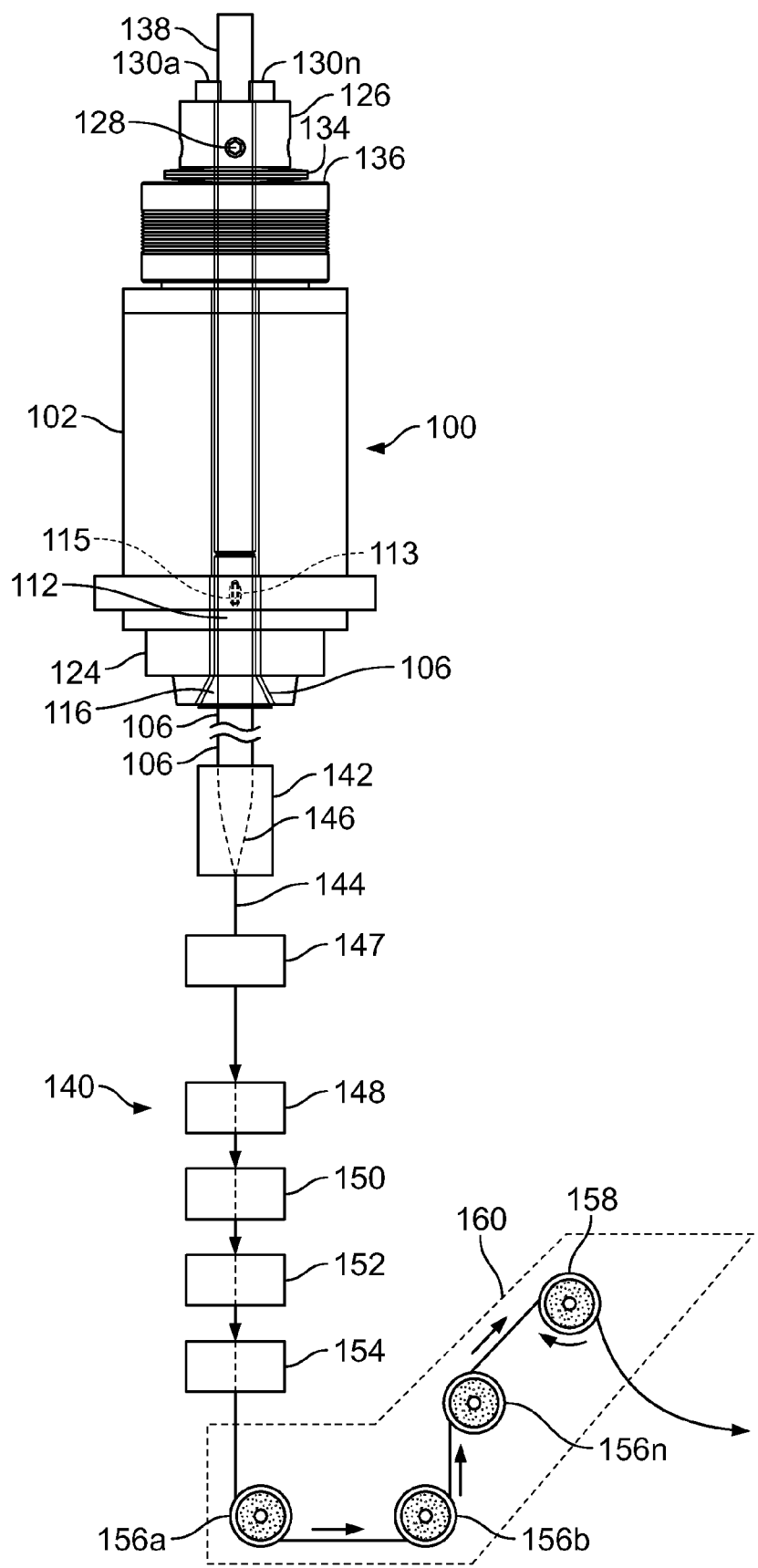
FIG. 6 schematically depicts the apparatus of FIG. 1 for securing and spinning the preform of FIG. 5 as it is fed into a conventional drawing apparatus, according to an embodiment of the present invention.

FIG. 6 schematically depicts the apparatus 100 for securing and spinning the preform 106 as it is fed into a conventional drawing apparatus 140, according to an embodiment of the present invention. After securing the preform 106 in the collet 108 and the spindle 102, the preform 106 is slowly fed (by means of a feed mechanism that is not shown) into a furnace 142, where a fiber 144 is drawn from a necked down portion 146 of the preform 106. The bare fiber 144 passes through a non-contact diameter monitor 147 into a coating applicator 148, wherein a polymer coating (frequently comprising an inner and an outer coating) is applied to the bare fiber 144. After passing through a coating concentricity monitor 150 (e.g., a non-contact concentricity monitor), the fiber 144 passes through a curing station 152 comprising, for example, UV lamps. A non-contact coating diameter monitor 154 may be located downstream from the curing station 152, followed by a guide apparatus (e.g., the guide rollers 156a-156n) and a drive apparatus (e.g., a pulling capstan 158) in region 160. It will be noted that the guide roller 156a is the first contact point of the fiber 144 with a solid. At this point, the fiber 144 is already protected by a cured polymer coating. It is also noted that a draw force is provided by the pulling capstan 158, and that the rotational speed of the pulling capstan 158 determines the draw speed. From the pulling capstan 158, the fiber 144 typically is lead to (independently driven) take-up means, e.g., a take-up spool (not shown). Those skilled in the art will recognize that FIG. 6 shows several optional features (e.g., 146, 150, 154), and does not show all possible features (e.g., a hermetic coating chamber between the furnace 142 and the coating applicator 148). Furthermore, FIG. 6 shows specific examples of the common fiber draw functions of monitoring fiber and coating diameter, applying polymer coatings, applying tension etc, though one skilled in the art would recognize that these functions can be performed in a variety of ways.

Embodiments of the present invention may provide for a method of manufacturing an optical fiber. An optical fiber preform is provided. The preform is received in a spindle having a substantially cylindrical bore along a longitudinal axis defined by the spindle. The preform is secured with a plurality of work holding devices positioned apart from each other along the longitudinal axis of the spindle and configured to secure the preform against the spindle at two or more distinct positions when the preform is spinning. A position of at least one of the work holding devices may be adjusted to shift the preform away from the longitudinal axis. Optionally, the spinning preform may be further secured by positioning a compression device about the preform between two or more work holding devices to prevent the work holding devices from moving from their intended position thermal expansion of materials. Optionally, the spinning preform may further be provided with a handle affixed to the preform to light guide radiative heat away from the apparatus.

Figure 7:
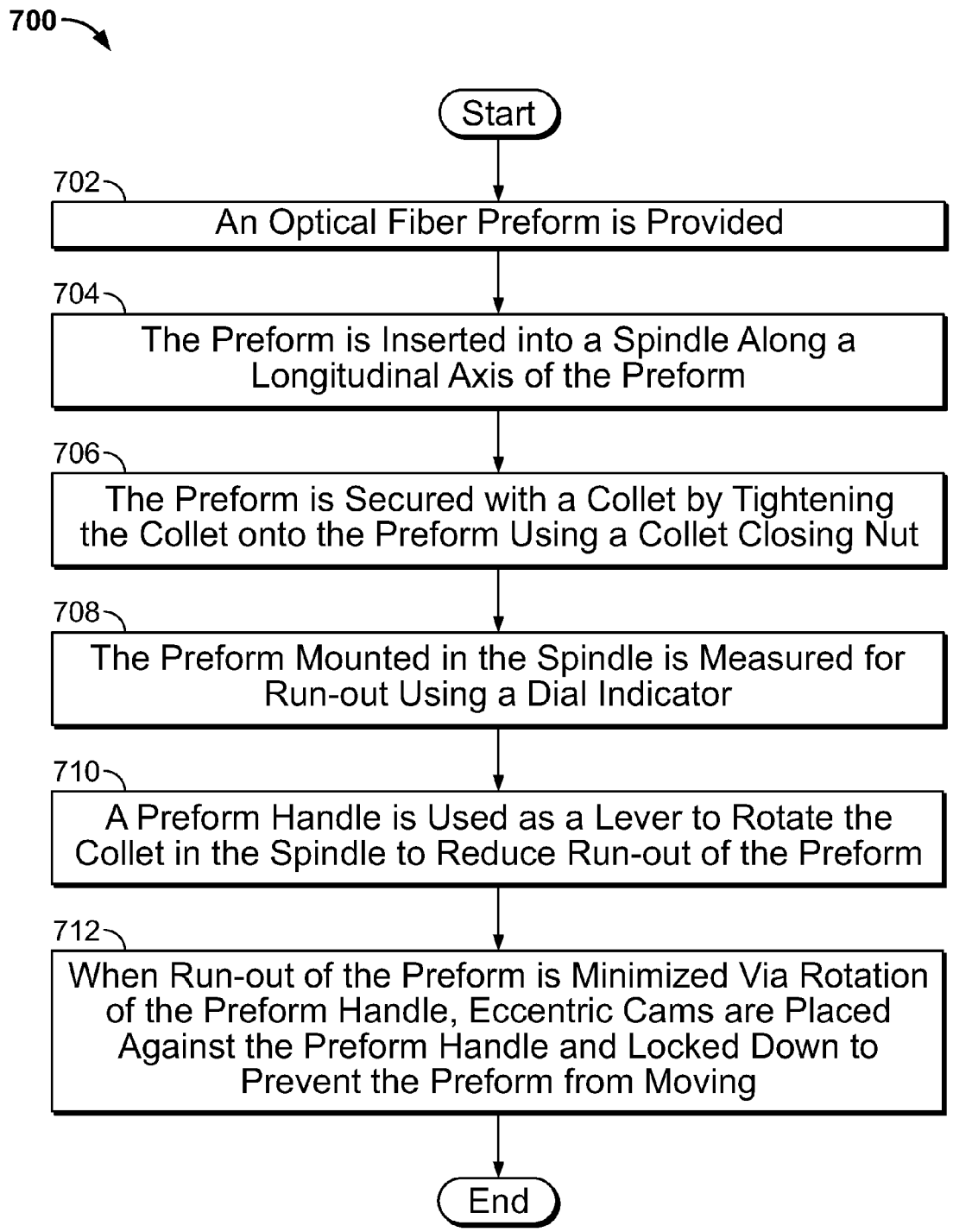
FIG. 7 is a process flow detailing a pre-drawing stage of a method of manufacturing an optical fiber using the apparatus of FIGS. 1-5, according to an embodiment of the present invention.

FIG. 7 is a process flow detailing a pre-drawing stage of one embodiment of a method 700 of manufacturing an optical fiber 144 using a spindle 102 with a collet 108, according to an embodiment of the present invention. Referring now to FIGS. 6 and 7, at block 702, the optical fiber preform 106 is provided. Optionally, a glass preform handle 138 is pre-affixed, e.g., by fusing, to the preform 106.

At block 704, the preform 106 is inserted into the spindle 102 along a longitudinal axis of the preform 106. At block 706, the preform 106 is secured with the collet 108 by tightening the collet 108 onto the preform 106 using the collet closing nut 126. At block, 708, the preform 106 mounted in the spindle 102 is measured for run-out using a dial indicator or other device for measuring run-out. At block 710, the preform is positioned in the collet 108 in the spindle 102 along the longitudinal axis of the preform 106 to reduce run-out of the preform 106. When run-out of the preform 106 is below a desired level at block 712, the eccentric cams 130a-130n are placed against the preform handle 138 and locked down to prevent the preform 106 from moving. The collet 108 and the eccentric cams 130a-130n hold the preform 106 in proper alignment when the preform 106 is spun and the twisted optical fiber 144 is drawn. In one embodiment, an angle of rotation of at least one of the eccentric cams 130a-130n may be adjusted before being locked down to the preform 106 to reduce run-out further.

Although the preform 106 may be secured in the collet 108 using the eccentric cams 130a-130n, heat from the draw process may cause the collet 108 to expand and thereby release the preform 106 while it is spinning. In such circumstances, the preform 106 may be further secured between upper end 136 of the spindle 102 and the collet closing nut 126 with the pair of cupped spring washers 134. The collet closing nut 126 compresses the cupped spring washers 134 to maintain tension on the preform 106 while it is in the furnace 142. As a result, the cupped spring washers 134 are held under compression between the upper end 136 of the spindle 102 and the collet closing nut 126 to prevent a releasing of the preform 106 during drawing of the optical fiber 144 and spinning of the preform 106. This has the added benefit of protecting the preform 106 and the collet 108 from excessive force.

Once the preform 106 is properly aligned and clamped in the spindle 102, then the preform 106 is inserted into the furnace 142.

The method of FIG. 7 reduces total run-out of the preform 106 while clamping onto the preform 106 to prevent the preform 106 from working itself loose during draw. The method of FIG. 7 also permits reduction of heating levels of the spindle 102, and permits greater twist rates than are currently supported using conventional spinning and drawing techniques.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An apparatus for manufacturing an optical fiber, comprising:
   a spindle having a bore for receiving a preform of the optical fiber along a longitudinal axis defined by the spindle and
   a plurality of work holding devices positioned apart from each other along the longitudinal axis of the spindle and configured to secure the preform against the spindle at two or more distinct positions when the preform is spinning, wherein a position of at least one of the work holding devices is adjustable to shift the preform away from the longitudinal axis, and wherein a compression device is positioned about the preform for preventing releasing of the preform during spinning.

2. The apparatus of claim 1, wherein the plurality of work holding devices comprises any combination of chucks, collets, cams, set screws, or shims.

3. The apparatus of claim 1, wherein one of the plurality of work holding device comprises a collet.

4. The apparatus of claim 3, wherein the preform is secured to the spindle at a lower end of the collet with a spindle nose.

5. The apparatus of claim 3, wherein the preform is secured to the spindle at an upper end of the collet with a collet closing nut.

6. The apparatus of claim 5, wherein the compression device is positioned about the preform between an upper end of the spindle and the collet closing nut for preventing the collet from unscrewing or extending from the spindle.

7. The apparatus of claim 6, wherein the compression device is a pair of cupped spring washers.

8. The apparatus of claim 7, wherein the cupped spring washers are configured to be held under compression between the upper end of the spindle and the collet closing nut and configured to prevent a releasing of the preform during a drawing of optical fiber from the preform and during a spinning of the preform.

9. The apparatus of claim 5, wherein another of the plurality of work holding device comprises a plurality of eccentric cams rotatably affixed to and extending longitudinally from the collet closing nut.

10. The apparatus of claim 9, wherein the plurality of eccentric cams is configured to securing the preform to the collet closing nut and to center the preform substantially along the longitudinal axis.

11. The apparatus of claim 1, further comprising a handle, which is affixable to the preform.

12. The apparatus of claim 11, wherein the handle is operable to light guide radiative heat away from the apparatus.

13. The apparatus of claim 12, wherein the handle is made of the same material as the preform.

14. The apparatus of claim 12, wherein the handle is fusable to the preform along a longitudinal axis of the preform.

* * * * *